Patented Jan. 9, 1923.

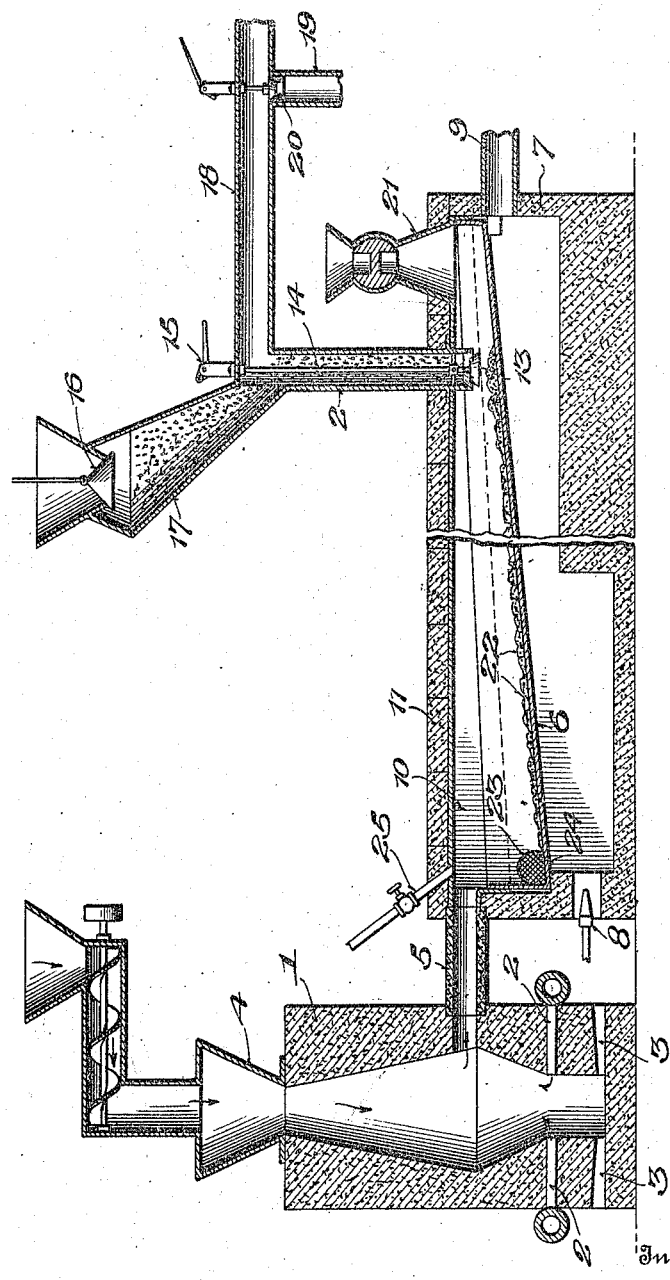

1,441,695

UNITED STATES PATENT OFFICE.

KARL P. McELROY, OF WASHINGTON, DISTRICT OF COLUMBIA, ASSIGNOR TO FERRO CHEMICALS INC., OF WASHINGTON, DISTRICT OF COLUMBIA, A CORPORATION OF DELAWARE.

PROCESS OF FIXING NITROGEN.

Application filed May 15, 1919, Serial No. 297,294. Renewed June 7, 1922. Serial No. 566,547.

*To all whom it may concern:*

Be it known that I, KARL P. McELROY, a citizen of the United States, residing at Washington, in the District of Columbia, have invented certain new and useful Improvements in Processes of Fixing Nitrogen, of which the following is a specification.

This invention relates to processes of fixing nitrogen; and it comprises a method of producing cyanids or ammonia wherein an alkali carbonate in a molten state is percolated through or flowed over carbon and iron or other iron group metal in countercurrent to a stream of hot producer gas, thereby producing molten cyanid and an enriched gas; all as more fully hereinafter set forth and as claimed.

As is well known, potassium carbonate mingled with carbon and iron turnings on exposure to the air at a temperature around a red heat readily goes over into potassium cyanid at the expense of the atmospheric nitrogen. The same action takes place in the absence of the iron, but only at higher temperatures. In the presence of iron, about 700°–900° C. suffice. In addition to cyanid, the action produces carbon monoxid. It is quite endothermic, absorbing much heat. The reactions are the same if producer gas be substituted for air or if sodium carbonate or barium carbonate be substituted for potassium carbonate. Many propositions have been made to utilize the action for commercial purposes; and in some cases with a degree of success. There are however many incident difficulties. In part these are the usual troubles in heating a pervious or granular mixture undergoing heat-absorbing reactions in a retort of any size without excessive heating of the retort walls. As I have found, this difficulty may be in large part overcome by the expedient employed by Castner in making sodium, viz, using the iron as balls or bodies of substantial size capable of carrying heat throughout the mix. Another difficulty lies in the character of the materials. Both potassium carbonate and sodium carbonate melt at temperatures a little over 800° C. Both give thinly fluid liquids flowing readily and exhibiting the ordinary capillary actions so that it is hard to preserve admixtures of carbonates with other materials at melting temperatures. At temperatures below 800° C. cyanidation is relatively slow and at temperatures much above, carbonate tends to liquate out of the mass. And, as stated, it is difficult to prevent high temperatures next the wall with retorts of any size. Liquation may to some extent be prevented by increasing the amount of iron or charcoal in the mix; but this introduces new difficulties if the cyanided mass be afterwards leached to recover cyanid. Leading without formation of ferrocyanids is difficult in any case. Further, at temperatures much above 800° cyanids have a tendency to volatilize.

In the present invention, advantage is taken of the stated properties, melting being utilized instead of avoided. The reaction mixture is kept at a sufficient temperature to produce free fluidity of the particular carbonate used, and the carbonate in a molten form is allowed to flow through or over iron and carbon as a thin layer, flowing in contact with producer gas. Presuming a horizontal or somewhat inclined retort to be used, carbonate is fed at one end and emerges as cyanid at the other. A simple filter of iron wire at the exit end holds back iron and carbon and prevents their going forward with the cyanid. A relatively pure product, requiring no leaching is thus obtained. It may flow into molds to form sticks or balls as it emerges, using any suitable type of molding machine. As a source of nitrogen I use producer gas flowing in countercurrent to the molten carbonate. The gas is improved in quality by the operation to the extent that it is freed of nitrogen and is enriched in carbon-monoxid by the reaction. Carbon may or may not be supplied with the carbonate. By a catalytic action of iron on carbon monoxid, the gas itself will supply carbon. Or a little oil or other hydrocarbon may be fed in with the producer gas. Gas from bituminous coal carrying carbon in the form of distillation gases is susceptible of use; but should, for the sake of carrying heat, be preheated. Ordinarily I find it better to add carbon to the reaction zone and use producer gas made from fixed fuel (coke or anthracite) in a high temperature producer (what is known as a slagging producer) as this enables me to take into the system much or all of the heat required. Presuming the gas to be at 1300° or 1400° C., the excess of heat above, say, 900° C. is available for compensating the endothermic action in the formation of cyanids. Such a gas will carry about the theoretical proportion of CO (about 33 per cent) prior to entering the apparatus and will be much richer on leaving; the extent of the enrichment of course depending upon the way the operation is conducted.

In adding carbon, I find it particularly advantageous to use charcoal in wheat or bean size, supplying this charcoal through the gas outlet of the apparatus. In so doing, any cyanid fumes which may escape with the gas are caught by the charcoal and returned; the charcoal acting as a gas filter, or, rather, an adsorbent purifying agent.

The operation may be conducted in any type of ordinary iron retort or tubular heating device; and, where a slightly enriched producer gas is a primary object, all the heat may be conveyed by the gas, a rapid stream flowing over the carbonate. Ordinarily however I supply some outside heat as well, if only to prevent radiation losses; and I find it better to use a flat, basin-like horizontal or slightly inclined iron plate with heating furnace or flame chamber beneath and carrying a detachable iron top, heat insulated by fire brick, magnesia, kieselguhr or other suitable material. This enables ready inspection and repair. The bottom plate may be in one or more sections; and may be of cast iron or made by flanging up a steel or iron plate. It may be corrugated or ribbed to give circuitous flow of carbonate; and the ribbing may give all the iron surface necessary. However, it is ordinarily simpler to have a flat bottom and provide for contact and catalysis by means of pieces of iron, such as bars, pipe sections, wire, nails, or the like. Or, lumps of iron ore (which are at once reduced to spongy iron) may be distributed over the bottom with an iron grid, shaped for the desired type of flow, to hold them in place.

Whatever the way adopted, the object is to provide iron so distributed in the path of the current of molten carbonate as not to interrupt the flow unduly. Charcoal, soot, etc., in the required amount is fed in with, or in addition to, the feed or carbonate, and flows forward with the carbonate, damming up more or less on the iron, till it disappears.

If ash constituents accumulate on the hearth, the apparatus may be cleaned by a flow of carbonate without carbon over the hearth for a time. Petroleum coke or other ashless forms of carbon may be used and allow a longer period of run without cleaning. Anthracite, coke breeze, etc., necessitate frequent cleaning. By adding a little natural gas or sprayed oil with the gas, carbon is produced in soot form and goes forward into the reaction chamber, to that extent enabling addition of carbon with the alkali to be dispensed with.

As the carbonate, in the event nitrogen fixation is the main purpose, potassium carbonate is better than sodium carbonate since it undergoes cyanidation quicker, i. e., requires a shorter apparatus. Where cyanid however is a main or market product, sodium carbonate is better since sodium cyanid is now the standard article in commerce. For nitrogen fixation, a mixture of sodium and potassium carbonates has advantages over either singly since it melts at a lower temperature and flows better.

In making cyanid, the molten product delivered after solidification (which may be in the usual molds) is directly marketable for most purposes. It may of course be purified in the usual ways. Where fixed nitrogen is the product desired, the hot molten cyanid may be delivered into a steam chamber or atomized with steam to convert the cyanid into ammonia and recover the alkali in oxidized form. If the temperature in this chamber is kept at, say, 150° C., the alkali is delivered in dry form and can be sent back to the cyaniding chamber at once.

In the accompanying illustration I have shown, more or less diagrammatically, certain apparatus within the described invention and capable of use in the performance of the described process. In this illustration the figure is a view in vertical section, certain parts being in elevation. For the sake of clarity of illustration the size of the reaction chamber is exaggerated in comparison with the size of the gas producer.

In this showing element 1 is an ordinary type of slagging gas producer provided with tuyères 2 for delivering cold or hot blast, advantageously a hot blast. In securing the hot blast, air may be heated in the usual well understood ways (not shown) by the aid of waste heat from the cyaniding apparatus. The producer is provided with slag outlets 3, a fuel feeding device 4 and an outlet 5 delivering hot gas. The temperature of this gas may be 1400° C. or more. The cyaniding apparatus as shown consists of a long narrow hearth 6 which may be of sheet iron or cast iron or even of copper. It is mounted on the top of a flame chamber or combustion space 7 having a gas burner 8 at one end and outlet 9 for products of combustion at the other end. The hearth of the cyaniding chamber is virtually a top for this flame chamber. As shown, the cyaniding chamber has a top 10 which may be of iron and heat insulated by layer 11 of bricks, magnesia, etc. Passing through the top or cover is a charcoal column and gas purifier 12. At its base this column is closed by plate 13, shown as somewhat coned. This may be moved up and down by stem 14 and lever 15 thereby controlling the flow of charcoal into the apparatus. Charcoal is supplied by bell and hopper 16 entering side conduit 17. From the charcoal column leads gas conduit 18. At 19 is an outlet which may be controlled by water cooled valve 20. Gas from this outlet may be led around by connections not shown for use in the heating chamber. Beyond the charcoal column is carbonate inlet 21 shown as of the usual type for feeding solid materials. As shown, the hearth is somewhat inclined and is provided with a number of pieces of solid iron 22. It is not necessary to provide both the charcoal inlet and the alkali inlet since the alkali and carbon may be fed in through the same inlet; but it is convenient to have separate inlets. Where the two are fed together they may be supplied in the calculated quantity of one molecule of carbonate to four atoms of carbon. Feeding the two separately has the advantage of allowing the hearth to be cleaned by alkali from time to time in the manner described. While caustic alkali may be supplied in lieu of carbonated alkali its use is not ordinarily worth while.

In the use of the described apparatus a certain amount of carbon is fed in by opening valve 13 and deposited on the hearth. Alkali carbonate is admitted at 21 and melted by the heat of the apparatus. It then flows forward, carrying carbon with it, through a more or less tortuous pathway formed by the iron on the hearth and reaches the other end of the apparatus fully cyanided. The molten cyanid flows out through exit 23 shown as provided with screen 24. This screen operates to hold back carbon, iron, sintered ash constituents, etc. The very hot producer gas entering through 5 gives up its heat and part of its nitrogen, receiving an addition to its content of CO. It passes out at 18 much enriched, any cyanid vapors being abstracted by the charcoal in 12. The heat required in the zone of reaction may be furnished mainly by burner 8 or mainly by the hot gas coming in from 5. In the former case the gas delivered at 18 may be very rich in CO. In the latter case, the enrichment is not so great since the flow of gas may be relatively fast in order to carry in the necessary number of heat units for a given production. Where heat of the gas is relied upon, burning of gas under the hearth may be wholly omitted. But I believe it better to burn some gas at least in order to keep the apparatus hot. In starting the use of a burner is always advisable.

The catalytic metal on the hearth may be iron in any of the forms stated or it may be one of the other iron group metals, cobalt or nickel. Both cobalt and nickel are very active catalysts in facilitating the cyanid reaction and though they are more costly than iron yet they are not consumed in use.

The cyanid formed may be steamed in the manner described and the oxidized alkali metal compounds recovered and returned to the zone of reaction at 21.

While I have shown the reaction chamber or hearth as slightly inclined it may have a high degree of inclination or even be vertical. With vertical or high angle position however the interior iron must be held in position in some way and so shaped as to give free passage of gas in one direction and of carbonate holding suspended carbon in the other; and it is therefore better and simpler to use the somewhat inclined horizontal apparatus shown. It is often advantageous to have the angle of inclination somewhat greater at the carbonate end than at the cyanid end for the reason that the carbonate is rendered slower flowing and apt to dam up on the iron by the presence of suspended carbon as it enters.

Impurities from the ash of the charcoal, dust carried in by the gas (which however is mostly carbon), etc., tend to accumulate in the apparatus and, as stated, may be removed periodically by flushing out with alkali. Or the apparatus may be cleaned out by taking off the top. In either event, the impurities removed carry alkali and though this may be recovered in the ordinary way by leaching it is simpler to put the cleanings into the producer, if the latter is of the hot-gas type shown. Here the alkali is converted into cyanid vapors which pass forward with the hot gas into the reaction chamber and add their cyanid to that produced therein. With a slag of the ordinary lime-alumina-silica type produced in iron furnaces but little of this alkali will be slagged off. In the gas producer it is necessary to add lime or limestone to slag the fuel ash; and if calcium carbonate from alkali factories and the like carrying some alkali be available, this alkali may be recovered as cyanid in the way just stated as regards the cleanings of the reaction chamber.

Oil or other hydrocarbon material, such as natural gas may be introduced directly into the reaction chamber by valved pipe 25 which is best water jacketed. All the hydrocarbons tend to break up at the temperature maintained in the reaction chamber into hydrogen, which goes forward with the gas, and carbon which is, for the most part, deposited on the iron, cobalt or nickel used as a catalyst for promoting the cyanid reaction, these metals being also active catalyzers of the dissociation of hydrocarbons. This carbon is ashless. Even where using carbon from this source for performing the bulk of the cyanidation, however, I use charcoal or some sort of porous petroleum coke in 12 as a gas filter; and pass more or less of it down on the hearth, partly for the purpose of recovering the cyanid and partly to give porous carbon on the hearth, through which the carbonate and cyanid may filter on their way to exit. Some or most of the carbon from filter 12 may be sent to the producer 1 where its cyanid is volatilized and returned to the reaction chamber and its carbon utilized to produce gas. The use of injected oil or hydrocarbon gas is particularly desirable where spongy iron (cobalt or nickel) is used on the hearth since it deposits carbon in the pores in a convenient way and since the metal is then not so much contaminated with ash constituents of charcoal.

What I claim is:—

1. The process of fixing nitrogen which comprises flowing a stream of molten alkali carbonate in countercurrent to hot producer gas in the presence of an iron group metal and carbon.

2. The process of fixing nitrogen which comprises establishing and maintaining a shallow pool of molten material in contact with overlying producer gas, feeding alkali carbonate to one end of said pool and removing molten cyanid from the other end.

3. The process of fixing nitrogen which comprises feeding alkali carbonate and carbon into one end of a relatively shallow, long pool of molten material containing a solid iron group metal, passing a countercurrent of producer gas thereabove, and tapping off molten cyanid in a filtered condition from the other end of the pool.

4. The process of fixing nitrogen which comprises converting alkali carbonate into alkali cyanid on a hearth in the presence of carbon and iron group metal and passing the waste gases through a carbon filter to remove vapors of cyanid.

5. The process of fixing nitrogen which comprises converting alkali carbonate into alkali cyanid on a hearth in the presence of carbon and iron group metal and passing the waste gases through a carbon filter to remove vapors of cyanid, said carbon being supplied to the hearth to return said cyanid and furnish carbon for the reaction.

6. The process of fixing nitrogen which comprises establishing and maintaining a relatively long pervious layer of iron group metal and carbon, percolating alkali carbonate therethrough and passing hot producer gas in countercurrent to the percolating flow.

7. The process of making cyanid and improving the quality of producer gas which comprises passing such gas in a hot condition in countercurrent to a flow of alkali carbonate passing in a path containing carbon and iron group metal.

In testimony whereof, I affix my signature hereto.

K. P. McELROY.